US012812500B2

(12) United States Patent
Yajima et al.

(10) Patent No.: US 12,812,500 B2
(45) Date of Patent: Nov. 24, 2026

(54) RELAY DEVICE WITH FREQUENCY SETTING CAPABILITY

(71) Applicant: AmaterZ, Inc., Tokyo (JP)

(72) Inventors: Masakazu Yajima, Tokyo (JP); Tamotsu Kiyakawauchi, Tokyo (JP); Yoshiyuki Sekiguchi, Tokyo (JP); Keita Otsuka, Tokyo (JP); Teruhisa Kamachi, Tokyo (JP); Hiroshi Tezuka, Tokyo (JP)

(73) Assignee: AMATERZ, INC., Tokyo (JP)

( * ) Notice: Subject to any disclaimer, the term of this patent is extended or adjusted under 35 U.S.C. 154(b) by 351 days.

(21) Appl. No.: 18/273,852

(22) PCT Filed: Jan. 24, 2022

(86) PCT No.: PCT/JP2022/002486
§ 371 (c)(1),
(2) Date: Jul. 24, 2023

(87) PCT Pub. No.: WO2022/158598
PCT Pub. Date: Jul. 28, 2022

(65) Prior Publication Data

US 2024/0098620 A1 Mar. 21, 2024

(30) Foreign Application Priority Data

Jan. 25, 2021 (JP) ................................ 2021-009309

(51) Int. Cl.
*H04W 40/22* (2009.01)
*H04W 84/22* (2009.01)

(52) U.S. Cl.
CPC ............ *H04W 40/22* (2013.01); *H04W 84/22* (2013.01)

(58) Field of Classification Search
CPC ..... H04W 40/22; H04W 84/22; H04W 84/18; H04W 4/38; H04W 72/04
See application file for complete search history.

(56) References Cited

U.S. PATENT DOCUMENTS 10,045,375 B2 * 8/2018 Serizawa ................ H04W 4/06
2015/0036540 A1 * 2/2015 Kasslin ................. H04W 48/16 370/254

(Continued)

FOREIGN PATENT DOCUMENTS

CN 111526519 A 8/2020
JP 2019-178527 A 10/2019
WO WO 2017/109817 A1 6/2017

OTHER PUBLICATIONS

Wireless Communication System, Detection System, and Wireless Communication Method , WO2017109817A1, Oura Satoru [JP]; Motokawa Hisashi [JP], English Translation, Jun. 29, 2017 (Year: 2017).*

(Continued)

*Primary Examiner* — Ian N Moore
(74) *Attorney, Agent, or Firm* — Birch, Stewart, Kolasch & Birch, LLP

(57) ABSTRACT

A wireless communication network system includes, a sensor device transmitting detected data, at least one relay device relaying the data, and a gateway device transferring the data to another network, wherein the sensor device, the relay device, and the gateway device being connected by a wireless communication network, wherein the relay device comprising: a receiver receiving a received signal containing the data; a storage storing heartbeat data; a transmitter transmitting a transmission signal containing the data received by the receiver and periodically transmitting a transmission signal containing the heartbeat data; and a frequency setting unit directing to set at least one of a (Continued)

frequency of the received signal received by the receiver and or a frequency of the transmission signal transmitted from the transmitter based on a frequency setting command transmitted from the gateway device.

14 Claims, 8 Drawing Sheets

(56) References Cited

U.S. PATENT DOCUMENTS

| | | | | |
|---|---|---|---|---|
| 2017/0367003 | A1* | 12/2017 | Zhang | H04W 92/14 |
| 2019/0140908 | A1* | 5/2019 | Ma | H04L 41/5058 |
| 2020/0404554 | A1* | 12/2020 | Nishiyasu | H04W 28/16 |

OTHER PUBLICATIONS

A Working Frequency Band Selection Method of Sub-network Fusion, CN 111526519 A, Zhang, Wen-jian, English Translation, Aug. 11, 2020 (Year: 2020).*

International Search Report (PCT/ISA/210), issued in PCT/JP2022/002486, dated Apr. 26, 2022.

* cited by examiner (a)

FIG. 7

(a)

| | |
|---|---|
| WIRELESS COMMUNICATION NETWORK | A |
| USER INFORMATION | USER1 |
| SENSOR DEVICE ID | 1001～1005 |
| RELAY DEVICE ID | 100a, 100b, 100c |
| BILLING INFORMATION | ¥10,000／month |

(b)

| | |
|---|---|
| WIRELESS COMMUNICATION NETWORK | B |
| USER INFORMATION | USER2 |
| SENSOR DEVICE ID | 2001～2010 |
| RELAY DEVICE ID | 200a, 200b, 200c, 200d, 200e |
| BILLING INFORMATION | ¥15,000／month |

*FIG.8*

(a)

| | |
|---|---|
| WIRELESS COMMUNICATION NETWORK | A |
| USER INFORMATION | USER2 |
| SENSOR DEVICE ID | 2003, 2004, 2009 |
| RELAY DEVICE ID | 100b, 100c |
| RELAY DEVICE USE | 24 |
| GW ARRIVAL TIMES | 4 |
| BILLING INFORMATION | ¥1,000 |

(b)

| | |
|---|---|
| WIRELESS COMMUNICATION NETWORK | A |
| USER INFORMATION | USER3 |
| SENSOR DEVICE ID | 3001, 3002 |
| RELAY DEVICE ID | 100a, 100b, 100c |
| RELAY DEVICE USE | 54 |
| GW ARRIVAL TIMES | 10 |
| BILLING INFORMATION | ¥3,000 |

RELAY DEVICE WITH FREQUENCY SETTING CAPABILITY

CROSS REFERENCE TO RELATED APPLICATIONS

The present application is based on and claims the benefit of priority from Japanese Patent Application No. 2021-009309 filed on Jan. 25, 2021, the disclosure of which is incorporated herein by reference.

TECHNICAL FIELD

The present invention relates to a relay device for relaying data transmitted from a communication device to another communication device, and a wireless communication network system including the relay device.

BACKGROUND

A technique for collecting, storing, and utilizing various data by transmitting the data collected from afar using low-power and long-distance wireless communication scheme such as LPWA (Low Power Wide Area) and the like has been known in the past.

A relay device can be used to solve a problem which LPWA signal does not reach due to landform or obstacles.

For example, Patent Literature 1 discloses a communication terminal device transmitting information detected by sensors, a relay device relaying the detected information, and a gateway device transmitting the detected and relayed information to a server via Internet.

The communication terminal device transmits the detected information with periodically changed frequency of carrier wave, and the relay device periodically switch the received frequency.

Patent Literature 2 discloses an automatic relay device comprising a transmitter and a receiver which can switch frequency. Patent Literature 3 discloses that two relay devices monitor each other by transmitting heartbeat signals.

PRIOR ART LITERATURE

Patent Literature

Patent Literature 1: JP2020-005137
Patent Literature 2: JP2002-118509
Patent Literature 3: JPH10-23057

SUMMARY OF THE INVENTION

The inventors of the present application found a problem as follows. When configuring a wireless communication network comprising a sensor device, a relay device, and a gateway device, if an adjacent wireless communication network exists it will be generally necessary to separate the wireless communication network from the adjacent wireless communication network. However, if these networks are integrally operated by enabling to share, it will be possible to configure a wireless communication network which covers wider area.

However, in this case, any means for switching between separation or enabling to share the wireless communication networks will be necessary. Also, any means for confirming whether switching between separation and share is performed without burdening on the wireless communication will be necessary.

Therefore, the purpose of the present invention is to realize a wireless communication network system and a relay device which can set whether the wireless communication networks are separated or enabling to share each other. The purpose of the present invention is also to realize a wireless communication network system and a relay device which can be confirmed whether switching between separation and share is performed without burdening on wireless communication.

A wireless communication network system (1) according to an embodiment of the present application is a wireless communication network system comprising: a sensor device (10) transmitting detected data, one or a plurality of relay devices (100) relaying the data, and a gateway device (11) transferring the data to another network, the sensor device, the relay device, and the gateway device being connected by a wireless communication network; wherein the relay device comprises a receiver (101) receiving a received signal containing the data; a storage (104) storing heartbeat data; a transmitter (102) transmitting a transmission signal containing the data received by the receiver and periodically transmitting a transmission signal containing the heartbeat data; and a frequency setting unit (103) directing to set a frequency of the received signal received by the receiver and/or a frequency of the transmission signal transmitted from the transmitter based on a frequency setting command transmitted from the gateway device.

A relay device (100) according to another embodiment of the present application is the relay device comprising: a receiver (101) receiving a received signal containing data transmitted from a first communication device; a storage (104) storing heartbeat data; a transmitter (102) transmitting a transmission signal containing the data received by the receiver to a second communication device and periodically transmitting a transmission signal containing the heartbeat data to the second communication device; and a frequency setting unit (103) directing to set a frequency of the received signal received by the receiver and/or a frequency of the transmission signal transmitted from the transmitter based on a frequency setting command transmitted from the second communication device.

The numbers in parentheses attached to the claim elements of the present disclosure described in this section and claims indicate the relationship between the present invention and the embodiments described below, and are not intended to limit the present invention.

Advantageous Effects of Inventions

According to the present disclosure, it becomes possible to set whether the wireless communication networks to be separated or enable to be shared. Also, according to the present disclosure, it becomes possible to confirm whether the switching between separation and share is performed without burdening on the wireless communication.

BRIEF DESCRIPTION OF THE DRAWINGS

FIG. 7 is a diagram illustrating contract information managed by the billing management device of the application example; and FIG. 8 is a diagram illustrating share information managed by the billing management device of the application example.

DETAILED DESCRIPTION

Embodiments of the present invention will now be described with reference to the drawings.

Note that the present invention indicates any inventions in claims and not limited to the embodiments below. Further, at least words within the double quotation means words and phrases described in the claims and is not limited to the following embodiments.

Configurations and methods described in dependent claims of claims should be interpreted as arbitrary configurations and arbitrary methods in the invention of independent claims. Configurations and methods of following embodiments corresponding to configurations and methods described in dependent claims, and configurations and methods described only in the following embodiments without descriptions in claims should be interpreted as arbitrary configurations and arbitrary methods in the present invention. In a case that the scope of claims is broader than descriptions of the embodiments, configurations and methods described in the following embodiments are just examples of configurations and methods of the present invention, which should be interpreted as arbitrary configurations and arbitrary methods in the present invention. In any cases, essential configurations and methods of the present invention should be interpreted based on independent claims.

Any effects described in embodiments are effects obtained when a configuration of an embodiment as an example of this disclosure and are not necessarily an effect of the present invention.

When there are a plurality of embodiments, the configuration disclosed in each embodiment is not limited to each embodiment alone, and may be combined across the embodiments. For example, the configuration disclosed in one embodiment may be combined with another embodiment. Further, the disclosed configurations may be collected and combined in each of the plurality of embodiments.

The problem described in this disclosure is not a publicly known problem, but person including the inventor has independently found out, and is a fact that affirms the inventive step of the invention together with the configuration and method of the present disclosure.

1. WIRELESS COMMUNICATION NETWORK

Figure 1:
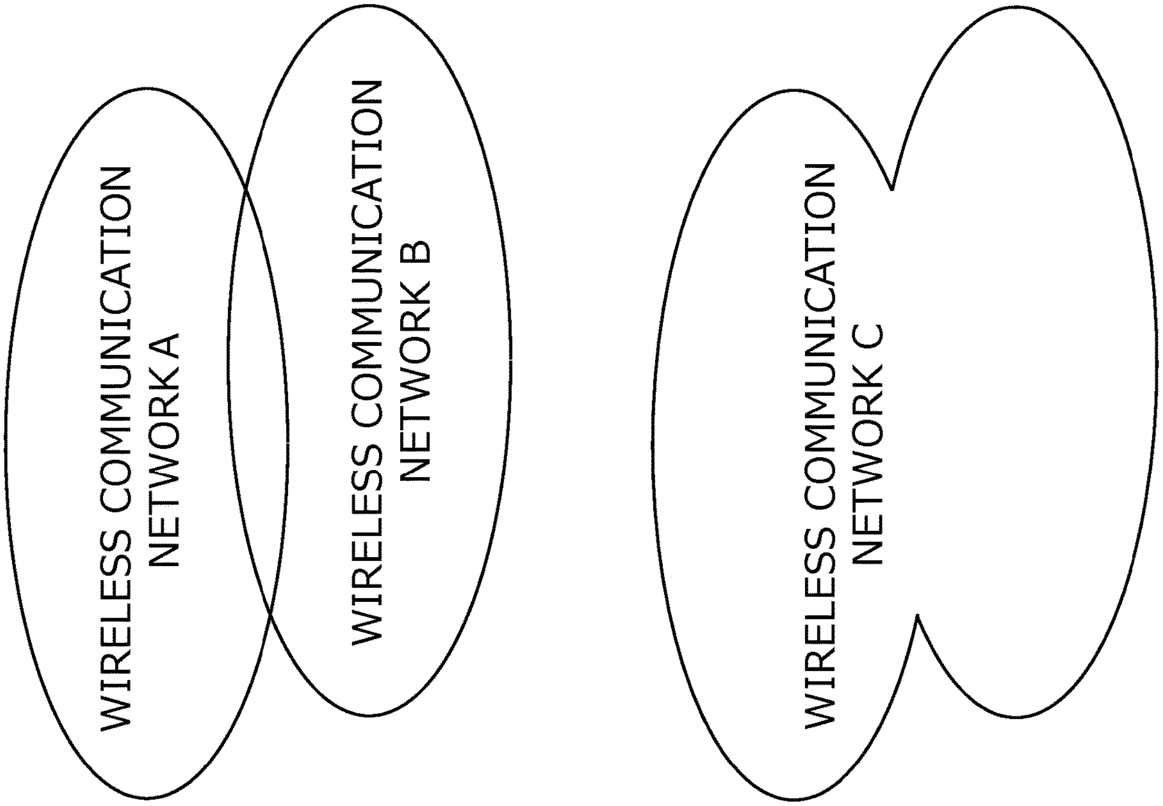
FIG. 1 is a diagram illustrating a wireless communication network of a present embodiment.

Referring to FIG. 1, a relationship between a wireless communication network and another adjacent wireless communication network of the present embodiment will be described.

In FIG. 1(*a*), a wireless communication network A is assumed to be a wireless communication network of the present embodiment. Within an area of the wireless communication network A, the devices existing in the area can communicate with each other. A wireless communication network B is a network adjacent to the wireless communication network A.

The wireless communication network A and the wireless communication network B exist independently and cannot communicate with each other since used communication resource such as frequency, time and spreading code and the like is different each other.

However, if the communication resource used by the wireless communication network A and the wireless communication network B is common as illustrated in FIG. 1(*b*), a wireless communication network C which covers all areas covered by the wireless communication network A or the wireless communication network B can be achieved.

Therefore, if it is possible to switch the situations between FIG. 1(*a*) and the situation of FIG. 1(*b*), the area covered by the wireless communication network can be changed depending on the usage of the wireless communication network.

For example, FIG. 1(*a*) is suitable for a network which uses high-privacy information. Otherwise, it is suitable for a network which needs to maintain communication environment since the network can prevent other wireless communication network device from using communication resource. Furthermore, when unauthorized use of wireless communication network is found, it can separate from such unauthorized access. In this specification, the situation shown in FIG. 1(*a*) will be called as separation.

FIG. 1(*b*) is suitable for a network which needs to obtain information from wider area. Especially, it is suitable to be used for public purpose, for example, for searching a missing person or collecting information under disaster. Furthermore, it may be also used during trial period for new contractors or under regular maintenance or emergency maintenance of the communication device. In this specification, the situation shown in FIG. 1(*b*) will be called as share.

2. WIRELESS COMMUNICATION NETWORK SYSTEM 1

Figure 2:
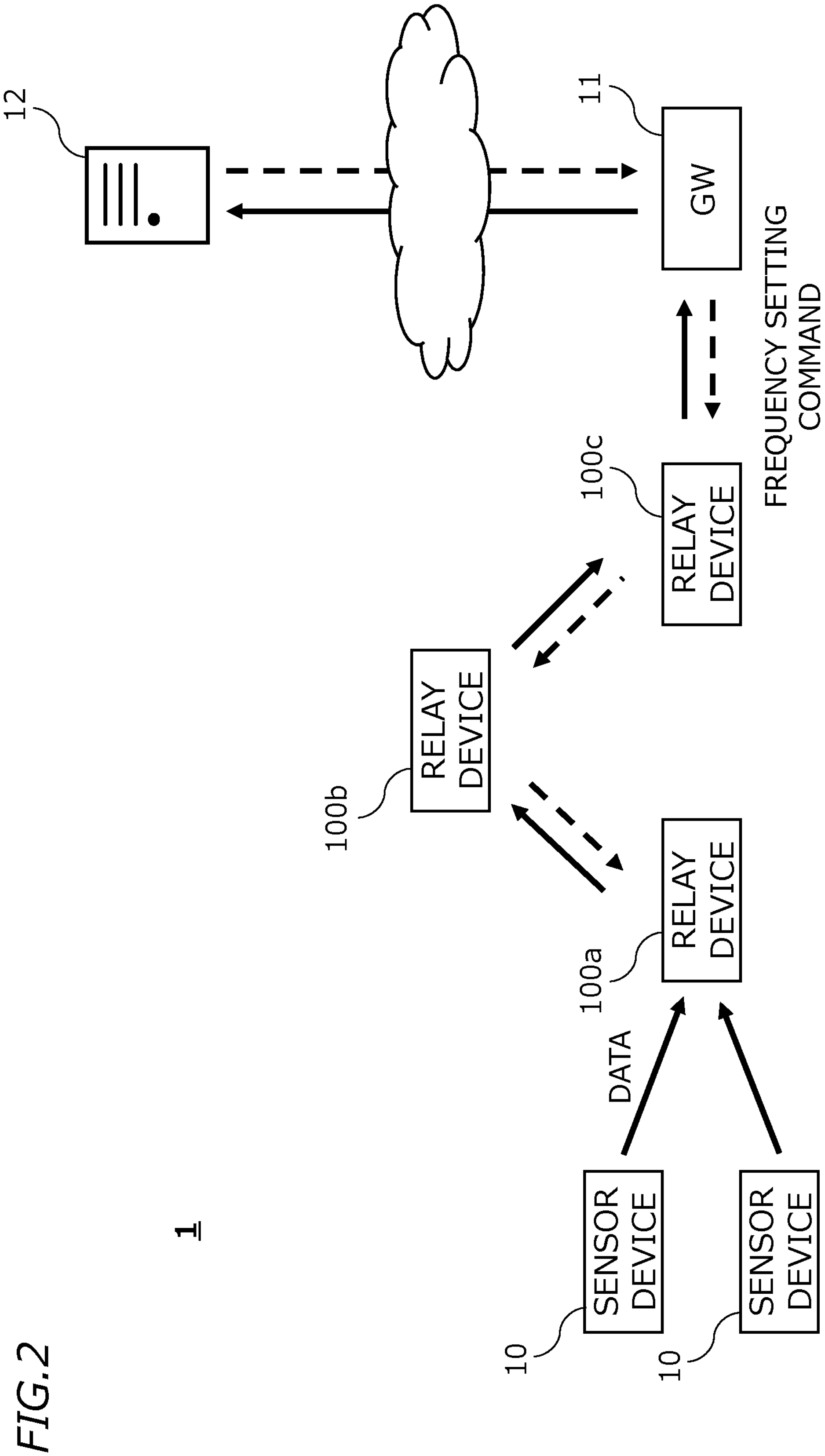
FIG. 2 is a block diagram illustrating a configuration of the wireless communication network system of the present embodiment.

Referring to FIG. 2, a summary of a wireless communication network system 1 of the present embodiment will be described.

The wireless communication network system 1 comprises a relay device 100*a*, a relay device 100*b*, a relay device 100*c*, a sensor device 10, a gateway device (hereinafter referred to as GW) 11, and a server device 12, and these devices are being connected to each other by a wireless communication network. Configurations of each device will be described later. When the general relay device including the relay device 100*a*, the relay device 100*b*, and the relay device 100*c* is described, the wording: relay device 100 will be used.

In the wireless communication network, the relay device 100 and the sensor device 10, the relay devices 100 each other, and the relay device 100 and the GW 11 communicate with each other using the wireless communication scheme. The wireless communication scheme communicates using, for example, broadband cellular communication called 3G, 4G, 5G or low-power and long-distance wireless communication scheme (LPWA (Low Power Wide Area)) scheme which enables lower power consumption and long-distance communication. LPWA scheme is a communication scheme which mainly uses 800/900 MHz band called Sub-Giga band, which includes, but is not limited to, eMTC (enhanced Machine Type Communication) proposed by 3GPP (Third Generation Partnership Project), NB-IoT (Narrow Band Internet of Things) optimized to perform small data communication, SIGFOX™ developed by Sigfox, or LoRa™ developed by Semtech. PARCA™ which features broadcast typed bidirectional communication proposed by the present applicant may be used. Otherwise, Wi-Fi™, ZigBee™, Bluetooth™, Bluetooth Low Energy (BLE) may be used for all or a part of the wireless communication scheme.

The sensor device 10 is a device which transmits detected data using a wireless communication scheme. The detail will be described later.

The GW 11 transfer the data received from the relay device 100 to the server device 12 via Internet. The GW 11 transmits a frequency setting command transmitted from the server device 12 to the relay device 100. The frequency setting command is a command which directs to set a frequency used by the wireless communication network 1. Specifically, it directs the frequency used by the relay device 100 when it transmits or receives the data. The detail will be described in the configuration of the relay device 100.

The server device 12 stores the data received from the GW 11 and analyzes the data using various programs. Not shown in FIG. 1, but an owner or user of the wireless communication network system 1 can access the server device 12 using any general communication device such as personal computer (PC), smartphone, or cellphone to use the data collected at the server device 12.

The server device 12 transmits the frequency setting command to the GW 11 according to the directions from the owner or user of the wireless communication network system 1. That is, the frequency setting command is transmitted from the server device 12 by the owner or user of the wireless communication network system 1 accessing the server device 12 using their own communication device and setting the frequency.

It should be noted that the sensor device 10 and the relay device 100 are described as different devices in the embodiment below. However, the sensor device 10 and the relay device 100 may be devices having same configurations. For example, the sensor device 10 may have a function of the relay device 100 below, and the relay device 100 may have a function of the sensor device 10 below.

In FIG. 2, a communication system is described in which three relay devices 100: a relay device 100*a*, a relay device 100*b*, and a relay device 100*c* are provided between the sensor device 10 and the GW 11. However, the number of the relay device 100 in the communication system 1 of the present embodiment may be arbitrary including singular.

In the present embodiment, the sensor device 10 and the relay device 100 adopt broadcast scheme as data transmitting method which does not designate transmit address. When broadcast scheme is adopted, the relay device 100 can be easily installed, since it is not necessary to predetermine relay source or relay destination from among a plurality of the relay devices 100. It should be noted that unicast scheme or multicast scheme which designate transmit address may be adopted.

3. OUTLINE OF EACH DEVICE COMPOSING OF WIRELESS COMMUNICATION NETWORK SYSTEM 1

(1) Configuration of the Sensor Device 10

The sensor device 10 is a device having a sensor feature for measuring and detecting data indicating surrounding environment of a place where the senor device 10 is located and a communication feature for transmitting the detected data using a wireless communication scheme.

The sensor device 10 obtains data indicating surrounding environment at a predetermined time interval (for example, 1 hour, 30 minutes, etc.), and transmits the data indicating the surrounding environment to the relay device 100 using a wireless communication scheme with broadcast scheme.

Examples of the data to be sent include temperature data, humidity data, vibration data, illumination data, water level data, or rainfall data. The temperature data is data indicating temperature detected by a temperature sensor, the humidity data is data indicating humidity detected by a humidity sensor, the vibration data is data indicating amplitude or frequency of vibration detected by a vibration sensor, the illumination is data indicating light intensity detected by a light sensor, the water level is data indicating water level detected by a water level gauge, the rainfall data is data indicating amount of rainfall detected by a sensor detecting rainfall. It should be noted that the vibration data may be an output from vibration power generation elements, and the illumination data may be an output from photovoltaic element.

The sensor device 10 may be installed at anywhere both indoors and outdoors to obtain the sensor data. For example, the sensor device 10 may be installed at farmland, pasture, or barn and the like. For example, if the sensor device is installed at paddy field, it can detect water level of the paddy field and daylight hours as well as surround temperature and humidity. If the sensor device is installed at pasture or barn, it can detect movement of livestock as well as temperature and humidity. Of course, the sensor device 10 may be directly attached to livestock. This enables a user being farmer or livestock farmer to use these sensor data collected at the server device 12 to monitor the situation of livestock from a distance.

As another example, the sensor device 10 may be installed at river, pond or dam, for example. For example, if the sensor device is installed at river, it can detect water level and velocity. This enables local government being a management body of river to use these sensor data collected at the server device 12 to monitor the situation of river from a distance. Furthermore, it is possible to predict a disaster such as floods using these sensor data.

In the present embodiment, the sensor device 10 is described as a device having both a sensor feature and a communication feature, however, the sensor device 10 of the present embodiment may be a physically separated sensor and communication device. In this case, the sensor and the communication device should be connected with wire or wirelessly.

Also, the sensor device 10 may be a dedicated device or any electronics mounting various sensors such as smartphone, mobile phone, tablet, smartwatch, smart-band, drone, and the like.

(2) Configuration of the Relay Device 100

Figure 3:
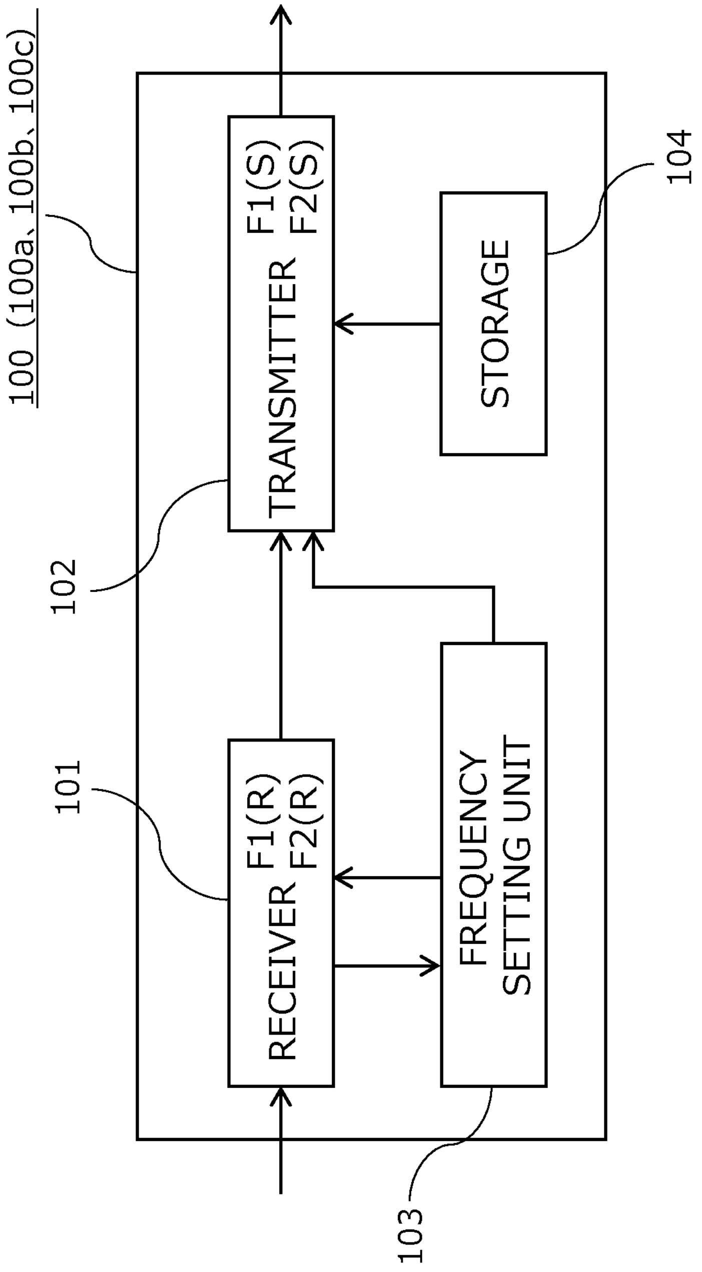
FIG. 3 is a block diagram illustrating a configuration of a relay device of the present embodiment.

Referring to FIG. 3, a configuration of the relay device 100 (100*a*, 100*b*, 100*c*) of the present embodiment will be described. The relay device 100 comprises a receiver 101, a transmitter 102, a frequency setting unit 103, and a storage 104.

The relay device 100*a*, the relay device 100*b*, and the relay device 100*c* shown in FIG. 2 have same configurations, as illustrated in FIG. 3. However, source of data received by the receiver 101 and destination of data transmitted from the transmitter 102 are different in these devices. That is, the relay device 100*a* is a relay device which relays data from the sensor device 10 to the relay device 100*b*. The relay device 100*b* is a device which relays data from the relay device 100*a* to the relay device 100*c*. The relay device 100*c* is a device which relays data from the relay device 100*b* to the GW 11. When generically expressing, the source of the relay device 100 is described as "first communication device", and the destination of the relay device 100 is described as "second communication device".

The receiver 101 receives the received signal containing the data transmitted from the "first communication device" using a wireless communication scheme. The receiver 101 may select and set a frequency of the received signal from among a plurality of frequencies. For example, it can receive the received signal with a frequency of the received signal as F1(R) (corresponding to "first frequency") or F2(R) (corresponding to "second frequency").

The transmitter 102 transmits the transmission signal containing the data received by the receiver 101 to the "second communication device" using wireless communication scheme. The transmitter 102 also periodically transmits the transmission signal containing heartbeat data described later to the "second communication device". The transmitter 102 may also select and set a frequency of the transmission signal to be transmitted from among a plurality of frequencies, as same as the receiver 101. For example, the transmission signal can be transmitted with a frequency of the transmission signal as F1(S) (corresponding to "first frequency"), or F2(S) (corresponding to "second frequency").

Two kinds of frequencies are described for the receiver 101 and the transmitter 102 in the present embodiment, but it may be equal to or more than three. In that case, the "first frequency" and the "second frequency" indicate any two frequencies among equal to or more than three frequencies.

In the present embodiment, the transmitter 102 transmits the transmission signal with broadcast scheme. When transmitting the signal with broadcast scheme, the relay device 100 may be configured to be simple as it is not necessary to designate destination. However, since relaying the data with broadcast scheme increases the amount of communication, it is necessary to prevent congestion. It is also necessary to arrange the direction along which the data flows so that the collected data is going toward the GW 11.

Therefore, in the present embodiment, the transmitter 102 transmits the transmission signal according to rules as below.

(a) The transmitter 102 makes delaying at random time when transmitting the transmission signal.

By making delaying at random time, it is possible to prevent from being transmitted at the same time with the data transmitted from another relay device, which can further prevent from getting defect by data collision as well as from temporarily increasing the amount of communication of the wireless communication network.

(b) The transmitter 102 does not transmit the data if it received the data which the transmitter has already transmitted.

By confirming relay history contained in the data or ID of the received data, it can be confirmed whether the data is data which the transmitter has already sent. By not transmitting the same data again, it is possible to prevent from increasing the amount of communication of the wireless communication network and to flow the data toward a direction which the GW 11 is installed.

(c) The transmitter 102 does not transmit the data when the number of transfer times reaches maximum.

By confirming transfer history contained in the data, the number of transfer times can be confirmed. It is possible to prevent from increasing the amount of communication of the wireless communication network by discarding the data which came through roundabout route.

(d) The receiver 101 suspends for a period of time when the transmitter 102 transmits a transmission signal.

By suspending the receiver 101 for a period of time after transmitting the data, it is possible to prevent from receiving the data again which the receiver 101 itself transmits before, which can further prevent from increasing the amount of communication of the wireless communication network and also can flow the data toward a direction which the GW 11 is installed.

The frequency setting unit 103 directs to set a frequency of the received signal received by the receiver 101 and/or a frequency of the transmission signal transmitted from the transmitter 102 to the receiver 101 and the transmitter 102, based on the frequency setting command transmitted from the GW 11. The frequency setting unit 103 may independently direct to set a frequency of the received signal received by the receiver 101 and a frequency of the transmission signal transmitted from the transmitter 102, respectively. For example, the frequency setting unit 103 may direct to set the same frequency as a frequency of the receiver 101 and a frequency of the transmitter 102, or it may direct to set different frequencies as a frequency of the receiver 101 and a frequency of the transmitter 102. The Specific setting example will be described later.

The storage 104 stores the heartbeat data. The heartbeat data is data to be transmitted in order to notify to surround devices that the relay device 100 is normally operated. In the present embodiment, the information below is used as the heartbeat data:

Identification information of the relay device 100 which generates and transmits the heartbeat data;

Voltage value or current value of a battery of the relay device 100;

Type of the heartbeat data (i.e. information for identifying whether it is the heartbeat data periodically transmitted or the heartbeat data transmitted at a predetermined timing); and Information indicating a set frequency when the frequency setting unit 103 sets the frequency).

Of course, any information other than this four information may be transmitted, or at least one of this four information may be transmitted. Especially, if the information indicating the frequency set by the frequency setting unit 103 is transmitted, it is possible to confirm whether a change of the frequency setting is succeeded or not at the server device 12.

Otherwise, the heartbeat data may include the number of frequency setting times. By confirming the number of frequency setting times at the server device 12, it is possible to obtain the rate which the device correctly reacts to the frequency setting command transmitted from the server device 12.

Otherwise, the heartbeat data may be predetermined data sequence (for example, FF (hexadecimal notation): 11111111 (binary notation)).

Otherwise, each relay device 100, which had relayed the heartbeat data from a relay device 100 which generated and transmitted the heartbeat data, may add its own identification information to the heartbeat data. This enables to confirm the relay route of the heartbeat data at the server device 12.

The heartbeat data is periodically transmitted from the transmitter 102. For example, it may be transmitted once every 30 minutes. The period may be variable. It is possible to confirm whether the frequency setting is succeeded or not at the server device 12 by using the heartbeat data transmitted after setting the frequency.

Otherwise, the heartbeat data may be transmitted at a predetermined timing instead of or addition to the periodical transmit. For example, it may be transmitted when the relay device 100 is turned on, when the relay device 100 receives the frequency setting command and sets/changes the frequency of the receiver 101 and/or transmitter 102. Especially, it is possible to promptly confirm whether the frequency setting is succeeded or not at the server device 12 by transmitting the heartbeat data when receiving the frequency setting command.

As described above, it is possible to confirm whether the frequency setting is succeeded or not at the server device 12 by using the heartbeat data. It is also possible to check the quality of communication after setting the frequency, for example, the change of defect rate of the data or the number of relay times by using the heartbeat data. The usage fee for wireless communication network can be automatically changed based on this change.

(3) Configuration of the GW 11

The GW 11 has a feature for mediating the communication between the relay device 100 and the server device 12. It means that the GW 11 is a device for connecting a wireless communication network in which the relay device 100 is provided and another network.

The GW 11 transmits the frequency setting command transmitted from the server device 12 to the relay device 100. The frequency setting command contains ID of the relay device 100 to be applied and frequency information indicating frequency to be used by the receiver 101 and the transmitter 102 of the relay device 100 to be applied.

(4) Configuration of the Server Device 12

The server device 12 stores the data received from the GW 11. Also, the server device 12 transmits the frequency setting command to the GW 11.

A trigger of the frequency setting command includes that the owner or user of the wireless communication network system 1 accesses the server device 12 using their own communication device to set the frequency, as described above.

Otherwise, the trigger of transmitting the frequency setting command includes a detection result of the sensor device 10, control information generated by connected external devices or application, or interrupt signal from other systems.

For example, in FIG. 1(*a*), a forestry worker, who holds the sensor device 10 corresponding to the wireless communication network A, worked within an area of the wireless communication network A, but he moved to outside the area covered by the wireless communication network A. In this case, the wireless communication network A of the GW 11 cannot receive the data from the forestry worker for a period of time. Then, the server device 12 transmits the frequency setting command to the GW of the wireless communication network B to change a frequency used for the wireless communication network B to the same frequency as the wireless communication network A. As a result, as shown in FIG. 1(*b*), the area of the wireless communication network A substantially is expanded to the area of the wireless communication network C.

Figure 5:
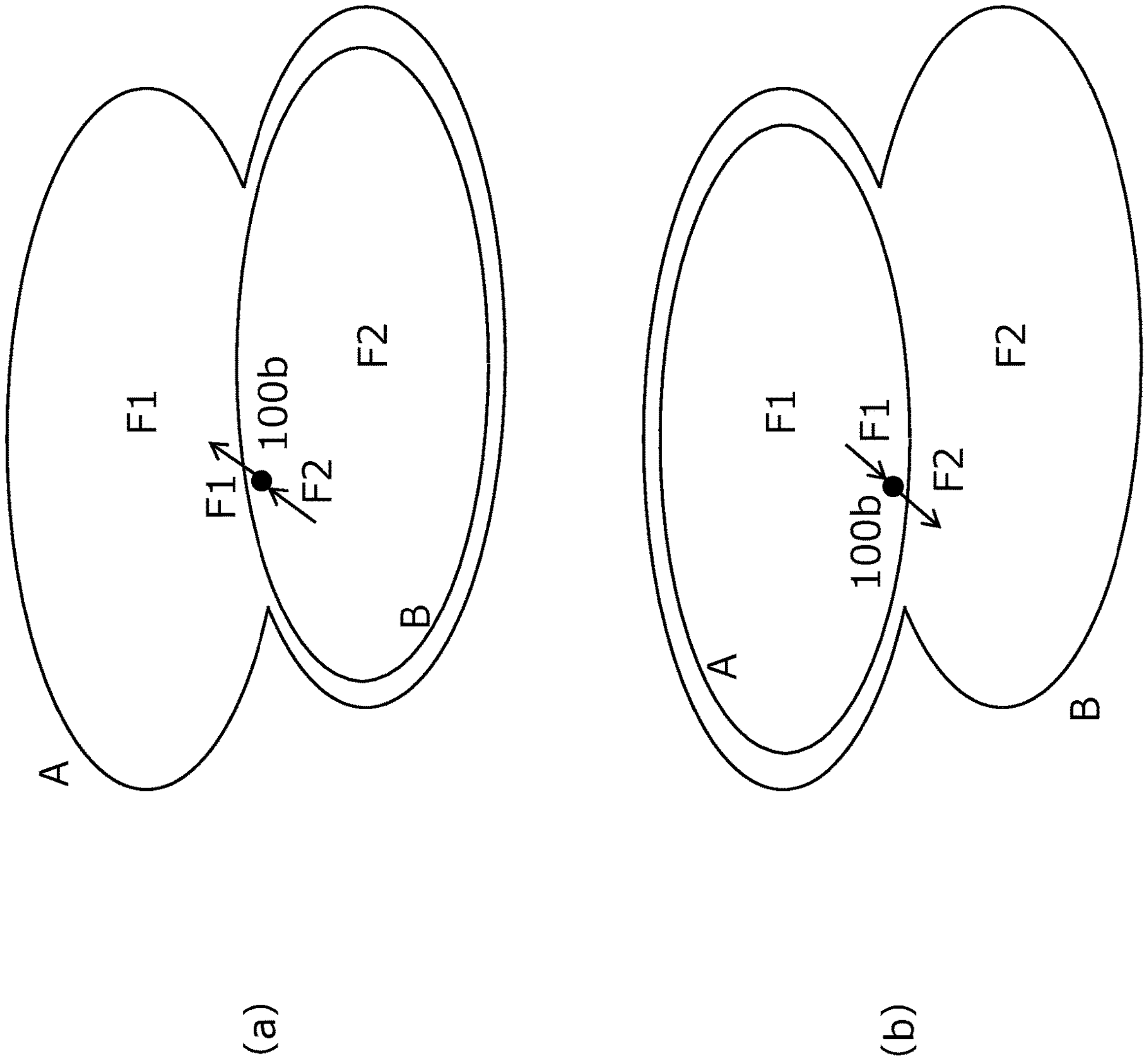
FIG. 5 is a diagram illustrating operations of the wireless communication network system of the present embodiment.

Even if the frequency of the sensor device 10 is fixed, for example, the relay device of the wireless communication network B can receive data if the data is transmitted using BLE from the sensor device 10 held by the forestry worker. Also, the relay device 100 of the wireless communication network B can relay data toward the GW 11 of the wireless communication network B. However, when the GW 11 of the wireless communication network B detects ID of the sensor device 10 and the like, it rejects transferring to the server device 12. In such a case, the GW 11 of the wireless communication network A can receive the data transmitted from the sensor device 10 held by the forestry worker within the area of the wireless communication network B, by realizing share as shown in FIG. 1(*b*) or one-way share as shown in FIG. 5(*a*) described later by the server device 12.

In an example of the forestry worker, the trigger is when the server device 12 or the GW 11 specifies a specific event, however, the trigger may be interruption from another system. For example, the server device 12 may transmit the frequency setting command to a controlled wireless communication network using supervisor call transmitted from a server device of the local government as interrupt signal when disaster occurs or a missing person is searched.

Otherwise, when performing shared wireless communication network, the server device 12 can realize a feature for managing how users are charged. This feature will be described later as application examples.

4. OPERATIONS OF WIRELESS COMMUNICATION NETWORK SYSTEM 1

Figure 4:
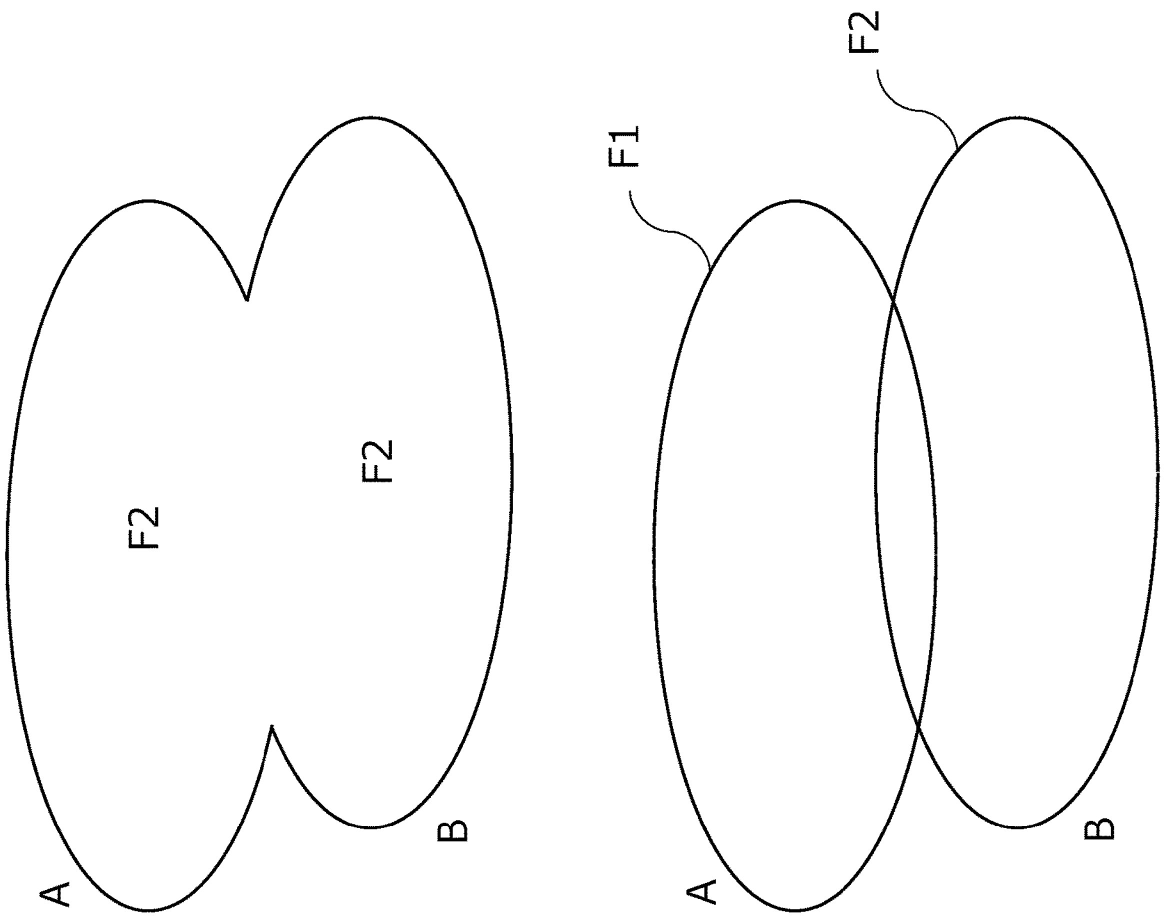
FIG. 4 is a diagram illustrating operations of the wireless communication network system of the present embodiment.

Referring to FIG. 4 and FIG. 5, operations of the wireless communication network system 1 will be described. The following operations is supposed that the wireless communication network B (corresponding to "adjacent wireless communication network") exists "adjacent" to the wireless communication network A of the present embodiment. It should be noted that the frequency used by the adjacent wireless communication network B has already known by the server device 12. That is, the server device 12 can obtain the frequency used by the wireless communication network B not only when managing the wireless communication network B by itself, but also by inquiring to other server device. Here, "adjacent" means that distance is short enough so that the areas where each transmission signals can arrive are overlapped.

(1) In case of Share

Referring to FIG. 4(*a*), operations in case of share will be described. It is supposed that both the wireless communication network A and the wireless communication network B are opened. The server device 12 generates the frequency setting command to set a frequency of the received signal received by the receiver 101 of the relay device 100 and a frequency of the transmission signal transmitted from the transmitter 102 as same as the frequency used by the wireless communication network B and transmits it to the GW 11. For example, if the wireless communication network B uses frequency F2, the frequency setting command containing ID of the relay device 100, frequency F2(R), and frequency F2(S) is transmitted.

The GW 11 transmits the frequency setting command to the relay device 100.

The frequency setting unit 103 of the relay device 100 which received the frequency setting command directs to set frequency F2(R) and frequency F2(S) to the receiver 101 and the transmitter 102, respectively. Then, the receiver 101 sets frequency F2(R) as the frequency of the received signal, and the transmitter 102 sets frequency F2(S) as the frequency of the transmission signal.

As a result, as shown in FIG. 4(*a*), both the wireless communication network A and the wireless communication network B become to use frequency F2, and thus they can mutually use the relay device 100 and the GW 11.

It should be noted that, if the receiver 101 and the transmitter 102 of the relay device 100 correspond to equal to or more than three frequencies (F1, F2, F3, . . . ), both the wireless communication network A and the wireless communication network B may use frequency F3.

(2) In Case of Separation

Referring to FIG. 4(*b*), operations in case of separation will be described. It is supposed that the wireless communication network A and the wireless communication network B are not opened. The server device 12 generates the frequency setting command to set a frequency of the received signal received by the receiver 101 of the relay device 100 and a frequency of the transmission signal transmitted from the transmitter 102 as being different from the frequency used by the wireless communication network B and transmits it to the GW 11. For example, if the wireless communication network B uses frequency F2, the frequency setting command containing ID of the relay device 100, frequency F1(R), and frequency F1(S) is transmitted.

The GW 11 transmits the frequency setting command to the relay device 100.

The frequency setting unit 103 of the relay device 100 which received the frequency setting command directs to set frequency F1(R) and frequency F1(S) to the receiver 101 and the transmitter 102, respectively. Then, the receiver 101 sets frequency F1(R) as the frequency of the received signal, and the transmitter 102 sets frequency F1(S) as the frequency of the transmission signal.

As a result, as shown in FIG. 4(*b*), the wireless communication network A uses frequency F1 and the wireless communication network B uses frequency F2, and thus the wireless communication network A and the wireless communication network B are separated.

It should be noted that, the frequency setting command which does not direct the frequency of the received signal received by the receiver 101 may be transmitted to the relay device 100*a* which receives the data from the sensor device 10 by mainly communicating with the sensor device 10. Especially, when the transmitting feature of the sensor device 10 only adapts to only one frequency, it is not necessary to direct the frequency of the received signal received by the receiver 101 of the relay device 100*a*. This enables to designate a frequency for only communication between the relay devices 100 and between the relay device 100 and the GW 11, and thus it becomes possible to change the setting only for core devices for wireless communication network. It should be noted that the data of the sensor device 10 may flow into the adjacent wireless communication network B. However, the necessary data and not necessary data can be separated at the GW 11 and the server device 12 of the wireless communication network B by confirming ID of the sensor device 10 and thus there is no operation issues, as long as there is no problem for data privacy.

(3) In Case of not Opening the Wireless Communication Network Itself, and Opening Adjacent Wireless Communication Network (One-Way Share)

Referring to FIG. 5(*a*), operations in case of one-way share will be described. It is supposed that the wireless communication network A is not opened, and the wireless communication network B is opened. It is also supposed that the wireless communication network A uses frequency F1, and the wireless communication network B uses frequency F2. The server device 12 generates, for the "closest relay device 100" to the wireless communication network B, the frequency setting command to set a frequency of the received signal received by the receiver 101 of the relay device 100 as F2(R) and a frequency of the transmission signal transmitted from the transmitter 102 as F1(S) and transmits it to the GW 11. If the closest relay device 100 is the relay device 100*b*, the frequency setting command contains ID of the relay device 100*b*, frequency F2(R), frequency F1(S). Here, the "for the closest relay device" is enough to include the closest relay device. For example, in addition to the closest relay device, it may transmit the frequency setting command to the second closest and the third closest relay device.

The GW 11 transmits the frequency setting command to the relay device 100*b*.

The frequency setting unit 103 of the relay device 100*b* which received the frequency setting command directs to set frequency F2(R) and frequency F1(S) to the receiver 101 and the transmitter 102, respectively. Then, the receiver 101 sets frequency F2(R) as the frequency of the received signal, and the transmitter 102 sets frequency F1(S) as the frequency of the transmission signal.

As a result, as shown in FIG. 5(*a*), the area covered by the wireless communication network B is original since the wireless communication network A is not opened, while the area covered by the wireless communication network A becomes an area which is an original area and added area covered by the wireless communication network B since the wireless communication network B is opened. Therefore, the GW 11 of the wireless communication network A can receive any data transmitted from sensor devices or any other terminal device existing in the opened wireless communication network B, while the GW of the wireless communication network B cannot receive the data transmitted from the sensor device 10 or any other terminal device existing in the not-opened wireless communication network A and only receive the data transmitted from the sensor device or any other terminal device existing in the wireless communication network B.

(4) In Case of Opening the Wireless Communication Network Itself, and not Opening Adjacent Wireless Communication Network (One-Way Share)

Referring to FIG. 5(*b*), operations in case of one-way share will be described. It is supposed that the wireless communication network A is opened, and the wireless communication network B is not opened. It is also supposed that the wireless communication network A uses frequency F1 and the wireless communication network B uses frequency F2. The server device 12 generates, "for the closest relay device 100", the frequency setting command to set a frequency of the received signal received by the receiver 101 of the relay device 100 as F1(R) and a frequency of the transmission signal transmitted from the transmitter 102 as F2(S) and transmits it to the GW 11. If the closest relay device 100 is the relay device 100*b*, the frequency setting command contains ID of the relay device 100*b*, frequency F1(R), and frequency F2(S).

The GW 11 transmits the frequency setting command to the relay device 100*b*.

The frequency setting unit 103 of the relay device 100*b* which received the frequency setting command directs to set frequency F1(R) and frequency F2(S) to the receiver 101 and the transmitter 102, respectively. Then, the receiver 101 sets frequency F1(R) as the frequency of the received signal, and the transmitter 102 sets frequency F2(S) as the frequency of the transmission signal.

As a result, as shown in FIG. 5(*b*), the area covered by the wireless communication network B becomes an area which is an original area and added area covered by the wireless communication network A since the wireless communication network A is opened, while the area covered by the wireless communication network A is original since the wireless communication network B is not opened. Therefore, the GW of the wireless communication network B can receive any data transmitted from the sensor device 11 or any other terminal device existing in the opened wireless communication network A, while the GW 11 of the wireless communication network A cannot receive the data transmitted from sensor devices or any other terminal device existing in the not-opened wireless communication network B and only receive the data transmitted from the sensor device 11 or any other terminal device existing in the wireless communication network A.

It is desirable that the closest relay device 100 is installed in an area in which the wireless communication network A and the wireless communication network B can communicate being overlapped in (3) and (4). Installing the device in such an area enables to mediate from one wireless communication network to another wireless communication network.

An example of a method to specify the relay device 100 installed in the area in which two wireless communication networks can communicate being overlapped, will be described. For example, the frequency used by the wireless communication network A and the wireless communication network B is set to be the same at the predetermined time zone using the method described in (1). Here, it is desirable to increase the transmission frequency of the heartbeat. The heartbeat data, which will be received by the GW 11 of the wireless communication network A, and which was transmitted from the relay device of the wireless communication network B, is focused. Using relay history of the relay device recorded in the heartbeat data, the relay device 100 of the wireless communication network A in which the heartbeat data is firstly relayed is the relay device 100 which is installed in the area in which two wireless communication networks can communicate being overlapped. Otherwise, when GPS is mounted on the relay device 100, it may be specified by using the location information obtained by GPS.

5. OTHER APPLICATION EXAMPLES

It is supposed that the relay device 100 in the present embodiment is a fixed device which is not moved, however, the relay device is configured to be "mounted on" a "movable body". When the relay device 100 is mounted on a movable body, it is possible to move the relay device 100 near the adjacent wireless communication network, which enables to effectively and certainly realize shared wireless communication network. Here, the wording "movable body" means any movable object and the moving speed is arbitrary. It includes of course when the movable body is stopped. For example, it includes vehicle, motorcycle, bicycle, pedestrian, ship, airplane, and any object mounted on those, but it is not limited to those. The wording "mounted on" includes when the device is directly fixed to a movable body, or when the device is not fixed to a movable body but is moved with the movable body. For example, it includes when the device is held by a person riding on a movable body, or when the device is mounted on a load loaded on a movable body.

6. SUMMARY OF EMBODIMENT

As described above, according to the present embodiment, since the frequencies of the receiver 101 and the transmitter 102 of the relay device 100 can be set and changed based on the frequency setting command transmitted from the gateway device, it is possible to set whether to separate or enable to share the wireless communication network and the adjacent wireless communication network. Also, according to the present embodiment, since the relay device periodically transmits a transmission signal containing heartbeat data, there is no need to transmit an acknowledgment (ack signal) to the frequency setting command, and thus it is possible to confirm whether the relay device 100 is operating correctly using the heartbeat data after setting and changing the frequency. Especially, by confirming that the heartbeat data is being transmitted with the changed frequency after setting and changing the frequency, it is possible to confirm that the frequency setting and change were performed correctly.

7. APPLICATION EXAMPLES (1) Billing Management Device

When the server device 12 performs shared wireless communication network as shown in FIG. 4(*a*), FIG. 5(*a*), or FIG. 5(*b*), it can be configured to manage billing for users using adjacent network. The server device 12 which can perform such billing management can also perform billing management under share in a broad sense in which a plurality of users uses one wireless communication network, in addition to the share as shown in FIG. 4(*a*), FIG. 5(*a*), or FIG. 5(*b*). Hereafter, such server device 12 is referred to as billing management device 13.

Figure 6:
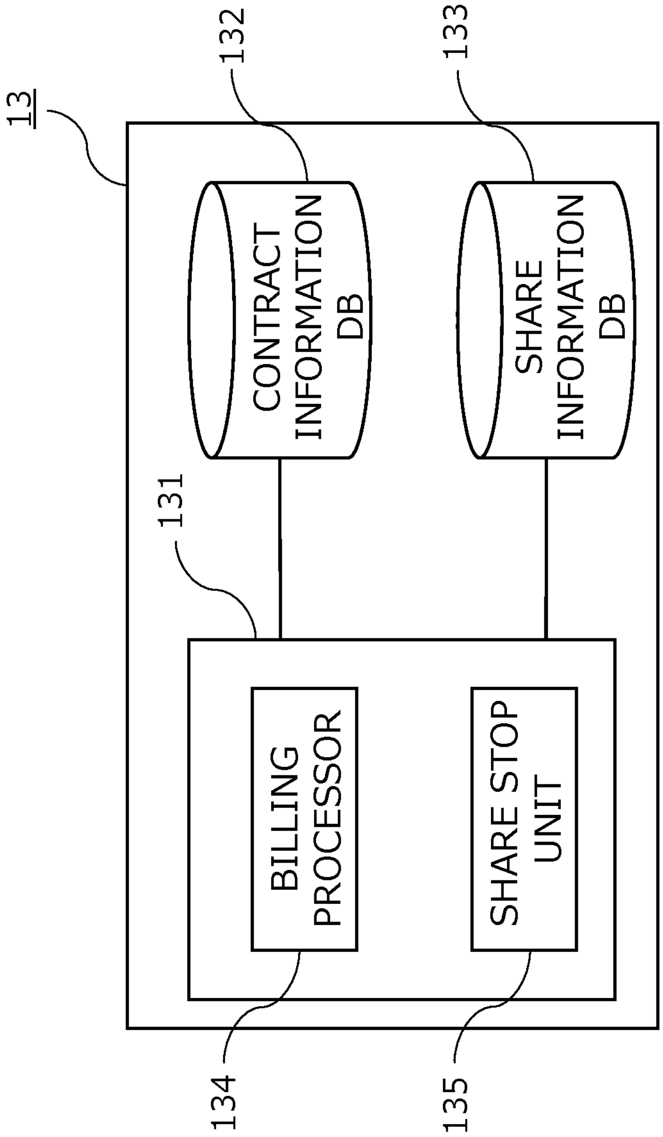
FIG. 6 is a diagram illustrating a configuration of a billing management device of an application example.

Referring to FIG. 6, a configuration of the billing management device 13 of an application example will be described. The billing management device 13 comprises a controller 131, a contract information database (DB) 132, a share information database (DB) 133. The controller 131 realizes the billing processor 134 and a share stop unit 135.

Referring to FIG. 7, an example of the contract information DB 132 will be described. User information, sensor device ID, relay device ID, and billing information are recorded in the contract information DB 132 for each wireless communication network.

The wireless communication network is information indicating the installed wireless communication network. FIG. 7(*a*) indicates that the wireless communication network A is installed. FIG. 7(*b*) indicates that the wireless communication network B is installed. The user information is information indicating contract body of the wireless communication network. FIG. 7(*a*) indicates that USER1 is a contractor. FIG. 7(*b*) indicates that USER2 is a contractor. The sensor device ID is information indicating the sensor device 10 installed by the contractor. FIG. 7(*a*) indicates that the installed sensor devices 10 are 5: 1001~1005. FIG. 7(*b*) indicates that the installed sensor devices 10 are 10: 2001~2010. The relay device ID is information indicating the relay device 100 installed by a contractor. FIG. 7(*a*) indicates that the installed relay devices 100 are 3: 100*a*, 100*b*, 100*c*. FIG. 7(*b*) indicates that the installed relay device 100 are 5: 200*a*, 200*b*, 200*c*, 200*d*, 200*e*. The billing information is information indicating usage fee of the wireless communication network. FIG. 7(*a*) indicates 10,000 yen per month. FIG. 7(*b*) indicates 15,000 yen per month.

Referring to FIG. 8, an example of the share information DB 133 will be described. The shared wireless communication network, user information, sensor device ID, relay device ID, the number of uses of the relay device, the number of the GW arrival times, billing information are recorded in the share information DB 133.

FIG. 8(*a*) illustrates the share information when USER 2 being a contractor of the wireless communication network B uses the wireless communication network A with share. Such share was described as in FIG. 4(*a*), FIG. 5(*a*), and FIG. 5(*b*). The shared wireless communication network is information indicating wireless communication network to be shared. FIG. 8(*a*) indicates that the wireless communication network A is the wireless communication network to be shared. The user information is information indicating user of the shared wireless communication network. FIG. 8(*a*) indicates that USER2 is a user. The sensor device ID is information indicating the sensor device 10 using the shared wireless communication network. FIG. 8(*a*) indicates that 2003, 2004, and 2009 among the sensor devices 10 installed by USER2 uses the wireless communication network A. The relay device ID is information indicating the relay device 100 used in the shared wireless communication network. FIG. 8(*a*) indicates that the used relay device 100 is 100*b* and 100*c*. The number of uses of the relay device is information indicating the number that the relay device 100 is used in shared wireless communication network. FIG. 8(*a*) indicates that the relay device 100 is used 24 times. The number of the GW arrival times is information indicating the number that the data transmitted from the sensor device 10 which is specified by the sensor device ID arrived at the GW 11 of the shared wireless communication network. FIG. 8(*a*) indicates that the data arrived 4 times to the GW 11 of the wireless communication network A. The billing information is information indicating usage fee incurred when using the shared wireless communication network. FIG. 8(*a*) indicates that 1000 yen is incurred for the usage fee. As the billing information, usage fee calculated by the billing processor 134 described below is recorded.

FIG. 8(*b*) indicates the share information when USER 3 is a user, who does not contract the wireless communication network and installed the sensor device 10 only, uses the wireless communication network A with the share in a broad sense. As each item is same as the item described for FIG. 8(*a*), the detailed description will be omitted.

The share information shown in FIG. 8 is generated using data transmitted from the sensor device 10 and information added to the data when the data is transferred via the relay device 10. For example, the data transmitted from the sensor device 10 contains user information of the sensor device 10 and sensor device ID. Then, the relay device ID is added at the relay device 100 which relayed the data, and the data is received by the GW 11 of the shared wireless communication network. By analyzing the data received by the GW 11, the shared wireless communication network, the number of uses of the relay device, the number of the GW arrival times can be obtained.

The billing processor 134 of the controller 131 calculates the billing amount for the user of the shared wireless communication network based on the share information of the share information DB 133. Although the method for calculating the billing amount is arbitrary, however, the billing amount may be calculated in proportion to the number of uses of the relay device and the number of the GW arrival times, for example. In FIG. 8(*a*), billing of 1000 yen has incurred for USER 2. It should be noted that, in this case, the usage fee for the shared user may be deducted from the usage fee for shared wireless communication network A. For example, in FIG. 8(*a*), the usage fee of 10,000 yen per month is incurred for a USER 1 who contracts wireless communication network A, however, 9,000 yen may be incurred for USER 1 by deducting 1,000 yen which is the usage fee incurred for USER 2 who used wireless communication network A.

The share stop unit 135 performs share stopping process when a specific condition is occurred. For example, it performs share stopping process when a user who used the shared wireless communication network does not pay the usage fee. An example of the share stopping process include to notify the relay device 100 of user information and sensor device ID so that the relay device 100 would not transfer the data containing the notified information. Otherwise, by notifying the GW 11 of user information and sensor device ID, it may not perform transferring from the GW 11 to the server device 12. Otherwise, by notifying the server device 12, processing on the servicer device 12, for example, data storage process may not be performed.

In the above example, the transfer and processing of all data including the notified information were stopped, but instead of this, the transfer and processing of a part of data may be stopped. For example, it may transfer only specific types of data such as temperature data and heartbeat data and not transfer other data. Alternatively, the number of each type of data to be transferred may be reduced.

Other cases where the share stop unit 135 perform share stop process include when a trouble occurred in the shared wireless communication network, or when the communication environment deteriorates by the number of transfer times or the amount of data transfer exceeds a threshold, and the like.

As described above, according to the billing management device 13 of the application examples, it is possible to adjust between a contractor and a user of the wireless communication network by properly performing billing process when the shared wireless communication network (including the share in a broad sense) is occurred.

(2) Monitoring or Watching

In the above embodiment, an example of the sensor device 10 held by a forestry worker is described. In a wireless communication network comprising the sensor device 10, the relay device 100, and the GW 11, regardless of whether there is a share function as shown in the present embodiment or not, it is possible to confirm the safety of workers and watch over the elderly people by attaching the sensor device 10 to workers in agriculture, forestry, and the elderly, and monitoring the data transmitted from the sensor device 10.

The transmission method of data transmitted from the sensor device 10 is considered to include spontaneous transmission in which a person such as a worker or an elderly person who the sensor device 10 is attached spontaneously transmits the data, and passive transmission in which the data collected by the sensor device 10 is transmitted without the person who the sensor device 10 is attached being aware of.

An example of spontaneous transmission is, for example, a feature for transmitting SOS. For example, a button operating on a hardware or software is provided with the sensor device 10, the SOS signal is transmitted by pushing the button by the person who the sensor device 10 is attached. Furthermore, by providing a plurality of buttons, the degree of emergency and importance can be set step by step. For example, three levels of button can be provided; I want to come if possible, I want to come when you have time, and I want to come right now. Providing such button enables to necessary communicate and downsize the signal to be transmitted.

An example of passive transmission includes as follows. It can detect abnormalities of a wearer based on data passively transmitted from the sensor device 10. For example, it is possible to confirm whether the wearer loses consciousness or fainted. Specifically, it can detect and determine abnormalities of the wearer when he does not move from a fixed point for a period of time based on location information of the sensor device 10, when there is no input for a period of time based on operation history of the sensor device 10 or any connected device, for example, smartphone or dedicated tag, when body temperature, pulse and the like deviate from the normal range based on wearer's biological information or high-level information generated from the biological information, when the movement or operation of devices used by the wearer is not detected based on the location information of device such as heavy machinery used by the wearer or movement information such as vibration, heat, and light. It is also possible to detect that an abnormality has occurred in the wearer from the correlation between environmental data. For example, it can detect and determine abnormalities of the wearer when the heater is not working regardless of low temperature, when light is not turned on regardless of dark surroundings, or when there is no ventilation regardless of gas concentration being high.

As above, using the sensor device 10 enables to monitor or watch over a person to which the sensor device 10 is attached.

(3) Other Inventions

The wireless communication network system and the relay device in the disclosure also discloses the following inventions in which the configuration of the frequency setting unit 103 is arbitrary. It is also the same as the invention of subordinate concept specifying specific configuration of the heartbeat data.

[Invention 1]

A wireless communication network system (1) comprising a sensor device (10) transmitting detected data, one or a plurality of relay devices (100) relaying the data, and a gateway device (11) transferring the data to another network, the sensor device, the relay device, and the gateway device being connected by a wireless communication network, wherein the relay device comprising a receiver (101) receiving a received signal containing the data; a storage (104) storing heartbeat data; and a transmitter (102) transmitting a transmission signal containing the data received by the receiver and periodically transmitting a transmission signal containing the heartbeat data.

[Invention 2]

A relay device (100) comprising: a receiver (101) receiving a received signal containing data sent from a first communication device; a storage (104) storing heartbeat data; and a transmitter (102) transmitting a transmission signal containing the data received by the receiver to a second communication device and periodically transmitting a transmission signal containing the heartbeat data to the second communication device.

The wireless communication network system and the relay device in the disclosure also discloses the following inventions in which the configuration relating to the heartbeat data is arbitrary.

[Invention 3]

A wireless communication network system (1) comprising a sensor device (10) transmitting detected data, one or a plurality of relay devices (100) relaying the data, and a gateway device (11) transferring the data to another network, the sensor device, the relay device, and the gateway device being connected by a wireless communication network, wherein the relay device comprising a receiver (101) receiving a received signal containing the data; a transmitter (102) transmitting a transmission signal containing the data received by the receiver; and a frequency setting unit (103) directing to set a frequency of the received signal received by the receiver and/or a frequency of the transmission signal transmitted from the transmitter based on a frequency setting command transmitted from the gateway device.

[Invention 4]

A relay device (100) comprising: a receiver (101) receiving a received signal containing data transmitted from a first communication device; a transmitter (102) transmitting a transmission signal containing the data received by the receiver; and a frequency setting unit (103) directing to set a frequency of the received signal received by the receiver and/or a frequency of the transmission signal transmitted from the transmitter based on a frequency setting command transmitted from a second communication device.

8. RECAPITULATION

The Features of the wireless communication network system and the relay device in each of the embodiments of the present invention have been described above.

Since the terms used in each embodiment are examples, the terms may be replaced with terms that are synonymous or include synonymous functions.

The block diagram used for the description of the embodiment is obtained by classifying and arranging the configurations of the device for each of the functions. Individual function blocks may be implemented by arbitrarily combining hardware and software. Further, since the block diagram illustrates functions, the block diagram can be understood as disclosure of a method and a program that implements the method.

Function blocks that can be understood as processes, flows, and methods described in the respective embodiments may be changed in order as long as there is no restrictions such as a relationship in which results of preceding other steps are used in one step.

The terms such as first, second, to N-th (where N is an integer) used in each of the embodiments and in the claims are used to distinguish two or more configurations and methods of the same kind and are not intended to limit the order or superiority.

INDUSTRIAL APPLICABILITY

The wireless communication network system and the relay device in the present embodiment can be used for searching a missing person and monitoring or watching over farmers as well as agriculture or river management. Also, the frequency used for transmitting or receiving is focused on as communication resource to be set or switched in the present embodiment, however, it may be other communication resource. For example, it may be channels for time division (TDD), code division (CDD), OFDM.

What is claimed is:

1. A wireless communication network system, comprising a sensor device wirelessly transmitting detected data;

at least one relay device wirelessly relaying the detected data to a gateway device; and the gateway device transferring the detected data to another network, the sensor device, the at least one relay device, and the gateway device being connected by a wireless communication network, wherein the at least one relay device comprises:

a receiver receiving a received signal containing the detected data;

a storage storing heartbeat data;

a transmitter transmitting a transmission signal containing the detected data received by the receiver and transmitting a transmission signal containing the heartbeat data to another communication device; and a frequency setting unit setting at least one of a frequency of the received signal received by the receiver and a frequency of the transmission signal transmitted from the transmitter based on a frequency setting command transmitted from the gateway device, wherein the heartbeat data includes information for notifying to device connected to the another network that the at least one of the frequency of the received signal and the frequency of the transmission signal has been successfully set by the frequency setting unit based on the frequency setting command.

2. The wireless communication network system according to claim 1, wherein the heartbeat data contains information which indicates the frequency set by the frequency setting unit.

3. The wireless communication network system according to claim 1, wherein the heartbeat data contains information which indicates the number of frequency setting times at the frequency setting unit.

4. The wireless communication network system according to claim 1, wherein the transmitter adds identification information of the relay device to the heartbeat data and transmits the heartbeat data by adding the identification information.

5. The wireless communication network system according to claim 1, wherein when the receiver receives heartbeat data from another relay device, the transmitter adds identification information of the relay device to the received heartbeat data and transmits the heartbeat data by adding the identification information.

6. The wireless communication network system according to claim 1, wherein the transmitter transmits the heartbeat data when the receiver received the frequency setting command.

7. The wireless communication network system according to claim 1, wherein the sensor device and the transmitter of the relay device transmits the detected data with a broadcast scheme.

8. The wireless communication network system according to claim 1, wherein in case that an adjacent wireless communication network which is adjacent to the wireless communication network exists, the gateway device transmits the frequency setting command to set the frequency of the received signal received by the receiver of the relay device and the frequency of the transmission signal transmitted from the transmitter as a same frequency as a frequency used by the adjacent wireless communication network.

9. The wireless communication network system according to claim 1, wherein in case that an adjacent wireless communication network which is adjacent to the wireless communication network exists, the gateway device transmits the frequency setting command to set the frequency of the received signal received by the receiver of the relay device and the frequency of the transmission signal transmitted from the transmitter as a frequency different from a frequency used by the adjacent wireless communication network.

10. The wireless communication network system according to claim 9, wherein the gateway device transmits, to the relay device that receives the detected data directly from the sensor device, the frequency setting command which does not direct to set a frequency of the received signal received by the receiver.

11. The wireless communication network system according to claim 1, wherein in case that an adjacent wireless communication network which is adjacent to the wireless communication network exists and the wireless communication network uses a first frequency and the adjacent wireless communication network uses a second frequency, the gateway device transmits the frequency setting command, to set the frequency of the received signal received by the receiver as the second frequency and to set the frequency of the transmission signal transmitted from the transmitter as the first frequency, to a closest relay device to the adjacent wireless communication network.

12. The wireless communication network system according to claim 1, wherein in case that an adjacent wireless communication network which is adjacent to the wireless communication network exists and the wireless communication network uses a first frequency and the adjacent wireless communication network uses a second frequency, the gateway device transmits the frequency setting command: to set the frequency of the received signal received by the receiver as the first frequency and to set the frequency of the transmission signal transmitted from the transmitter as the second frequency, to a closest relay device to the adjacent wireless communication network.

13. The wireless communication network system according to claim 1, wherein the relay device is mounted on a movable body.

14. A relay device configuring a wireless communication network system, the wireless communication network system comprising:

a sensor device wirelessly transmitting detected data;

at least the one relay device wirelessly relaying the detected data to a gateway device; and the gateway device transferring the detected data to another network, the sensor device, the at least the one relay device, and the gateway device being connected by a wireless communication network, wherein the at least one relay device comprises:

a receiver receiving a received signal containing the detected data;

a storage storing heartbeat data;

a transmitter transmitting a transmission signal containing the detected data received by the receiver and transmitting a transmission signal containing the heartbeat data to another communication device; and a frequency setting unit setting at least one of a frequency of the received signal received by the receiver and a frequency of the transmission signal transmitted from the transmitter based on a frequency setting command transmitted from the gateway device, wherein the heartbeat data includes information for notifying to device connected to the another network that the at least one of the frequency of the received signal and the frequency of the transmission signal has been successfully set by the frequency setting unit based on the frequency setting command.

* * * * *